US012802175B2

(12) United States Patent
Kim et al.

(10) Patent No.: US 12,802,175 B2
(45) Date of Patent: Nov. 17, 2026

(54) IMAGE PROCESSING METHOD AND IMAGE PROCESSING DEVICE BASED ON NEURAL NETWORK

(71) Applicant: Samsung Electronics Co., Ltd., Suwon-si (KR)

(72) Inventors: Gyehyun Kim, Suwon-si (KR); Beomseok Kim, Suwon-si (KR); Youjin Lee, Suwon-si (KR); Taeyoung Jang, Suwon-si (KR); Youngo Park, Suwon-si (KR); Yongsup Park, Suwon-si (KR); Sangmi Lee, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 18/616,953

(22) Filed: Mar. 26, 2024

(65) Prior Publication Data

US 2024/0233092 A1 Jul. 11, 2024

Related U.S. Application Data

(63) Continuation of application No. PCT/KR2022/014405, filed on Sep. 27, 2022.

(30) Foreign Application Priority Data

Sep. 30, 2021 (KR) ........................ 10-2021-0130287

(51) Int. Cl.

| | |
|---|---|
| ***G06K 9/00*** | (2022.01) |
| ***G06T 5/50*** | (2006.01) |
| ***G06T 5/60*** | (2024.01) |

(52) U.S. Cl.

CPC .................. *G06T 5/60* (2024.01); *G06T 5/50* (2013.01); *G06T 2207/20016* (2013.01); *G06T 2207/20084* (2013.01); *G06T 2207/20216* (2013.01)

(58) Field of Classification Search

CPC ........................ G06T 5/50; G06T 2207/20216

See application file for complete search history.

(56) References Cited

U.S. PATENT DOCUMENTS 9,767,596 B2 9/2017 Jung
10,510,146 B2 12/2019 Talathi (Continued)

FOREIGN PATENT DOCUMENTS

CN 113344997 A * 9/2021 ............. H04N 23/80
CN 113609889 A * 11/2021 ............. G06N 3/045

(Continued)

OTHER PUBLICATIONS

Moon et al., Image Restoration using GAN. Journal of Broadcast Engineering, Online: http://koreascience.or.kr/article/JAKO201824753344154.pdf, vol. 23, No. 4, pp. 503-510, Jul. 18, 2018.

(Continued)

*Primary Examiner* — Molly Wilburn
*Assistant Examiner* — Aidan Keup
(74) *Attorney, Agent, or Firm* — Nixon & Vanderhye, P.C.

(57) ABSTRACT

Provided are an image processing method and an input processing device based on a neural network, the method including: obtaining a feature map distinguishing between a near object and a distant object of a low-resolution input image, obtaining a composited weight map for the low-resolution input image by inputting the feature map to a first Deep Neural Network (DNN), obtaining a first image by (Continued)

inputting the low-resolution input image to a second DNN suitable for restoring a distant object, obtaining a second image by inputting the low-resolution input image to a third DNN suitable for restoring a near object, and obtaining a high-resolution image for the low-resolution input image by performing weighted averaging on the first image and the second image using the composited weight map.

17 Claims, 19 Drawing Sheets

(56) References Cited

U.S. PATENT DOCUMENTS

| | | | |
|---|---|---|---|
| 10,692,185 | B2 | 6/2020 | Wang |
| 10,762,606 | B2 | 9/2020 | Tate |
| 10,885,608 | B2 | 1/2021 | Zhang |
| 11,024,009 | B2 | 6/2021 | Shi |
| 2019/0050681 | A1 | 2/2019 | Tate |
| 2020/0372608 | A1 | 11/2020 | Lee |
| 2021/0073945 | A1 | 3/2021 | Kim et al. |
| 2021/0104018 | A1 | 4/2021 | Moon |
| 2021/0144357 | A1 | 5/2021 | Kim |
| 2022/0375602 | A1 * | 11/2022 | Jaber .................... G06N 3/0464 |
| 2023/0288910 | A1 * | 9/2023 | Chen ..................... G06T 3/4053 |

FOREIGN PATENT DOCUMENTS

| | | | |
|---|---|---|---|
| CN | 113327219 | B | 1/2022 |
| JP | 2017228874 | A | 12/2017 |
| KR | 20190110965 | A | 10/2019 |
| KR | 20190119550 | A | 10/2019 |
| KR | 102103984 | B1 | 4/2020 |
| KR | 102188035 | B1 | 12/2020 |
| WO | 2020101246 | A1 | 5/2020 |

OTHER PUBLICATIONS

Shi et al., Single Image Super-Resolution Using Depth Map as Constraint, IEEE Xplore, pp. 538-542, 2020.
International Search Report and Written Opinion of the ISA for PCT/KR2022/014405 mailed Jan. 17, 2023, 13 pages.
Office Action issued Dec. 22, 2025 in Korean Patent Application No. 10-2021-0130287 with English translation.

* cited by examiner

IMAGE PROCESSING METHOD AND IMAGE PROCESSING DEVICE BASED ON NEURAL NETWORK

CROSS-REFERENCE TO RELATED APPLICATIONS

This application is a continuation of International Application No. PCT/KR2022/014405 designating the United States, filed on Sep. 27, 2022, in the Korean Intellectual Property Receiving Office and claiming priority to Korean Patent Application No. 10-2021-0130287, filed on Sep. 30, 2021, in the Korean Intellectual Property Office, the disclosures of each of which are incorporated by reference herein in their entireties.

BACKGROUND

Field

The disclosure relates to an image processing method and image processing device for restoring an original image to a high-resolution image based on a neural network, and for example, to an image processing method and image processing device for restoring a high-resolution image by restoring a near object to be clear and restoring a distant object to be soft through a Deep Neural Network (DNN) suitable for near-field restoration and a DNN suitable for long-distance restoration.

Description of Related Art

With the development of artificial intelligence-related technology and the development and distribution of hardware capable of reproducing and storing high-resolution/high-definition images, there is an increasing need for a method and device for effectively restoring original images to high-definition/high-resolution images based on a Deep Neural Network (DNN).

SUMMARY

An image processing method based on a neural network, according to an example embodiment of the present disclosure, may include: obtaining a feature map distinguishing between a near object and a distant object of a low-resolution input image; obtaining a composited weight map for the low-resolution input image by inputting the feature map to a first Deep Neural Network (DNN); obtaining a first image by inputting the low-resolution input image to a second DNN suitable for restoring a distant object; obtaining a second image by inputting the low-resolution input image to a third DNN suitable for restoring a near object; and obtaining a high-resolution image for the low-resolution input image by performing weighted averaging on the first image and the second image using the composited weight map.

An image processing device based on a neural network, according to an example embodiment, may include: a memory; and at least one processor, comprising processing circuitry. At least one processor, individually and/or collectively, may be configured to: obtain a feature map distinguishing between a near object and a distant object of a low-resolution input image. At least one processor, individually and/or collectively, may be configured to obtain a composited weight map for the low-resolution input image by inputting the feature map to a first DNN. At least one processor, individually and/or collectively, may be configured to obtain a first image by inputting the low-resolution input image to a second DNN suitable for restoring a distant object. At least one processor, individually and/or collectively, may be configured to obtain a second image by inputting the low-resolution input image to a third DNN suitable for restoring a near object. At least one processor, individually and/or collectively, may be configured to obtain a high-resolution image for the low-resolution input image by performing weighted averaging on the first image and the second image using the composited weight map.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
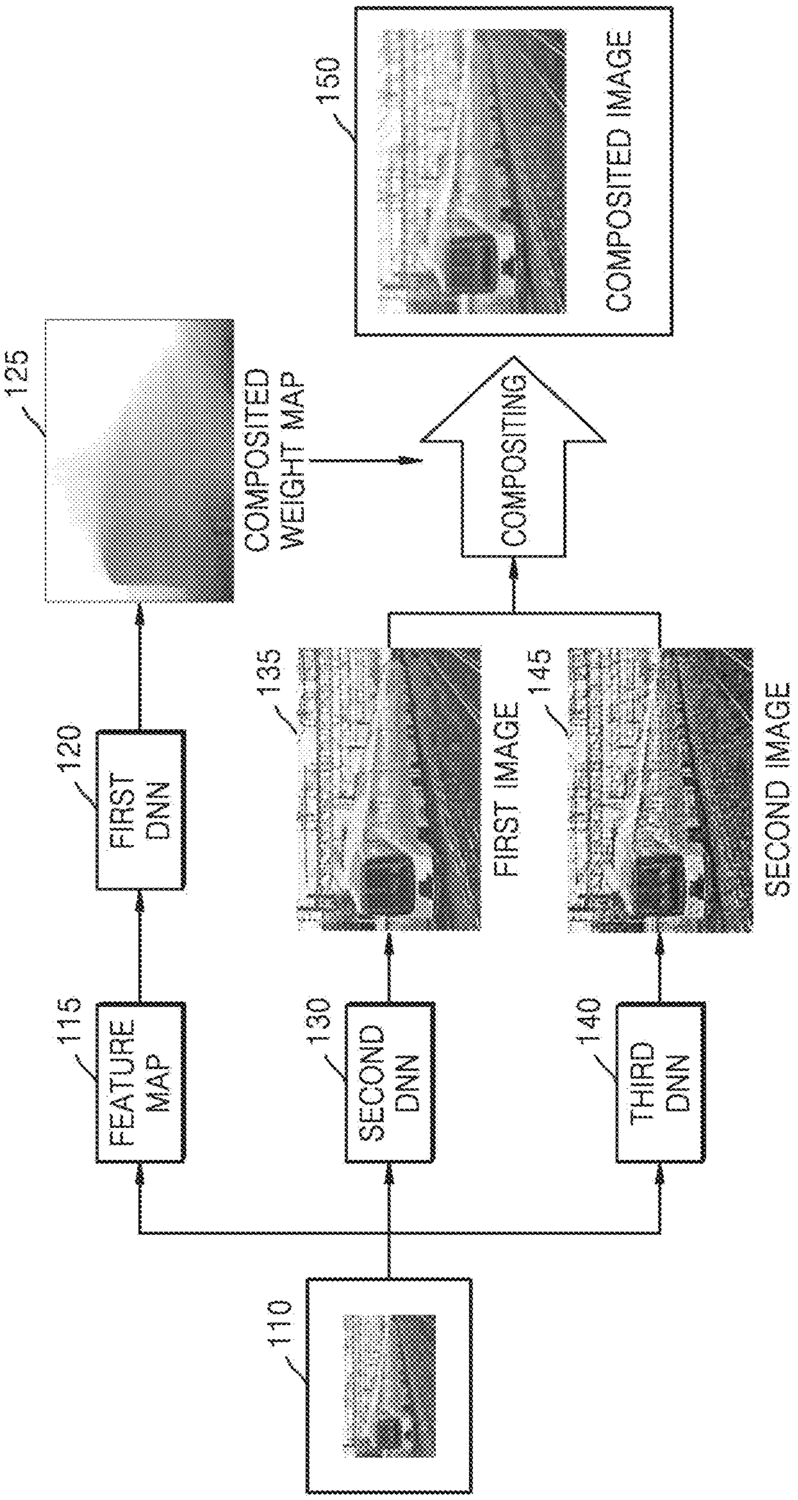
FIG. 1 is a diagram illustrating an example method of improving image quality of an input image based on a plurality of Deep Neural Networks (DNNs), according to an embodiment of the present disclosure.

In the present disclosure, the expression "at least one of a, b or c" indicates "only a", "only b", "only c", "both a and b", "both a and c", "both b and c", "all of a, b, and c", or variations thereof.

Although the present disclosure includes various modifications and various embodiments, various example embodiments are illustrated in the drawings and described in greater detail in the detailed description. It is to be understood, however, that the present disclosure is not to be limited to the various embodiments, but includes all modifications, equivalents, and alternatives falling within the spirit and technical scope of various embodiments.

In the following description, if it is determined that the detailed description of the related known technology may unnecessarily obscure the gist of the present disclosure, the detailed description thereof may be omitted. Also, numbers (for example, first, second, etc.) used in the following description may be reference numerals used simply to distinguish a component from other components.

In the present disclosure, it will be understood that, when a component is referred to as being "connected to" or "coupled to" another component, it may be directly connected to or coupled to the other component or it may be connected to or coupled to the other component via another component unless the context clearly dictates otherwise.

In the present disclosure, two or more components each expressed as 'portion (unit)', 'module', etc. may be combined into one component, or a component may be divided into two or more components according to segmented functions. Each of components described below may additionally perform some or all of functions of other components in addition to main functions that itself is in charge of, and some of the main functions of each component may also be performed exclusively by another component.

In the present disclosure, 'image' or 'picture' may represent a still image, a moving image configured with a plurality of successive still images (or frames), or video.

In the present disclosure, 'deep neural network (DNN)' is a representative example of an artificial neural network model that simulates brain nerves, and is not limited to an artificial neural network model using a specific algorithm.

In this disclosure, 'low-resolution input image' may refer, for example, to an image that is target of image quality improvement. 'Depth map' may refer, for example, to an image about distances of pixels existing in a low-resolution input image. 'Feature map' may refer, for example, to an image that distinguishes between near objects and distant objects in a low-resolution input image. 'Composited weight map' may refer, for example, to an image about weights for compositing two images restored from two DNN models. 'Compositing' may refer, for example, to restoring an image by performing weighted averaging on two images restored from two DNN models based on a composited weight map.

A 'first image' may refer, for example, to an image obtained through a DNN suitable for restoring a distant object using a low-resolution input image as an input. 'Second image' may refer, for example, to an image obtained through a DNN suitable for restoring a near object using a low-resolution input image as an input. 'High-resolution image' may refer, for example, to a high-definition/high-resolution image restored from a low-resolution input image by performing weighted averaging on a first image and a second image by applying the first image and the second image to a composited weight map. 'Distant object' may refer, for example, to a relatively distant object among objects in a low-resolution input image. 'Near object' may refer, for example, to a relatively near object among objects in a low-resolution input image. 'Objects' may refer, for example, to any and/or all objects (for example, a background, a distant building, a near structure, etc. in an input image) in a low-resolution input image.

Hereinafter, a method for restoring a high-definition/high-resolution image by compositing a plurality of images obtained based on a plurality of DNNs according to a composited weight map will be described in greater detail.

Methods shown in FIGS. 1 to 4, 7 to 10, 13 to 15, and 17 may be performed by a processor 1820 of an image processing device 1800 of FIG. 18, which will be described in greater detail below.

FIG. 1 is a diagram illustrating an example method for improving image quality of an input image based on a plurality of DNNs, according to an embodiment of the present disclosure.

Referring to FIG. 1, the processor 1820 of the image processing device 1800 may obtain a feature map 115 that distinguishes between a near object and a distant object of a low-resolution input image 110 from the low-resolution input image 110, and obtain a composited weight map 125 of the low-resolution input image 110 through a first DNN 120 using the feature map 115 as an input. The first DNN 120 may for example, and without limitation, be a general Convolutional Neural Network (CNN) including a convolutional layer. The first DNN 120 may have been trained to obtain a composited weight map of an input image using, as an input, a feature map that distinguishes between a near object and a distant object.

The processor 1820 of the image processing device 1800 may obtain a first image 135 through a second DNN 130 suitable for restoring a distant object using the low-resolution input image 110 as an input. The second DNN 130 may have characteristics of generating blurred output images with low noise and removing small textures from the output images. The processor 1820 of the image processing device 1800 may obtain a second image 145 through a third DNN 140 suitable for restoring a near object using the low-resolution input image 110 as an input. The third DNN 140 may have characteristics of generating clear output images due to its excellent texture restoration but leaving artifacts. The second DNN may for example, and without limitation, be a general CNN based on an L1 loss model or an L2 loss model, and the third DNN may be a CNN based on a generative adversarial network (GAN) loss model.

The processor 1820 of the image processing device 1800 may obtain a composited image 150 by performing weighted averaging on the first image 135 and the second image 145 to composite the first image 135 with the second image 145 based on the composited weight map 125. A near object included in the composited image 150 may be clearer than that included in the low-resolution input image 110, and a distant object included in the composited image 150 may be softer than that included in the low-resolution input image 110. Accordingly, the composited image 150 may be a restored image of higher-resolution/higher-definition than those of the low-resolution input image 110.

Figure 2:
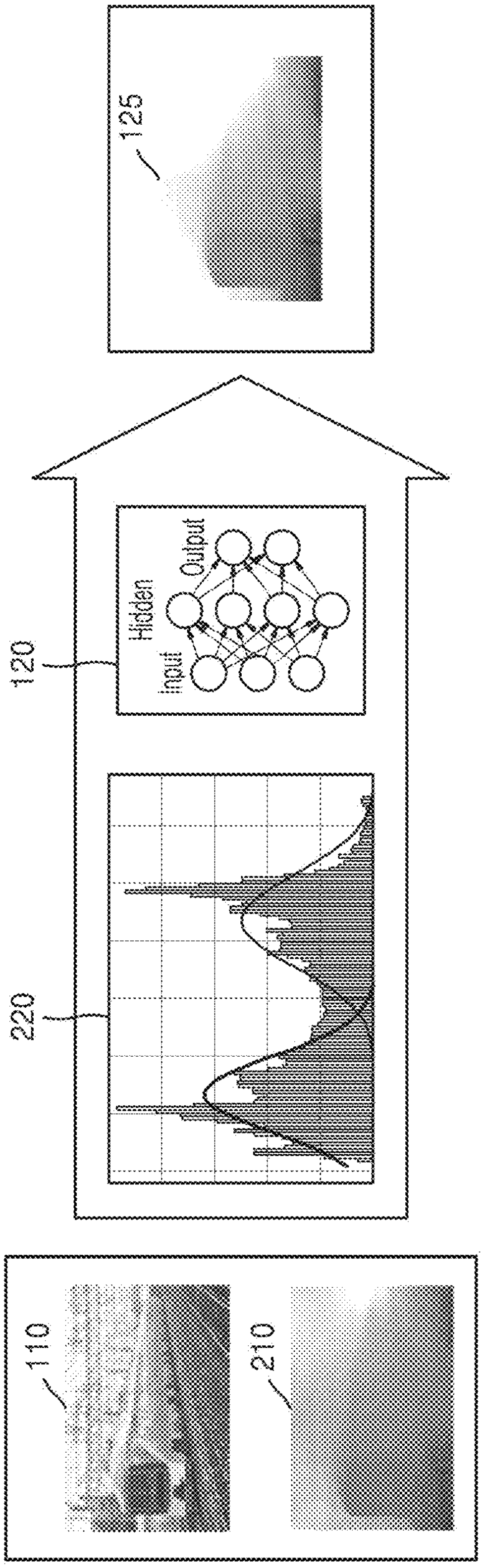
FIG. 2 is a diagram illustrating an example method of obtaining a composited weight map according to a depth map of an input image, according to an embodiment of the present disclosure.

FIG. 2 is a diagram illustrating an example method for obtaining a composited weight map according to a depth map of an input image, according to an embodiment of the present disclosure.

Referring to FIG. 2, the processor 1820 of the image processing device 1800 may obtain a depth map 210 of the low-resolution input image 110, obtain the feature map 115 based on a distance value distribution of all pixels of the low-resolution input image 110 by applying a distribution model 220 to the depth map 210, and generate or obtain the composited weight map 125 of the low-resolution input image 110 by inputting the feature map 115 to the first DNN 120.

The processor 1820 of the image processing device 1800 may obtain the composited weight map 125 for compositing two images obtained from two DNN models. The composited weight map 125 may be predicted based on distance information. For example, a distance distribution of a background and object of an image is approximated to a Gaussian distribution, based on a distance value distribution of all pixels of the image, thereby clustering distance values of pixels of the background and object.

The Gaussian distribution is a representative example of a distribution model, and the distribution model is not limited to the Gaussian distribution.

Figure 3:
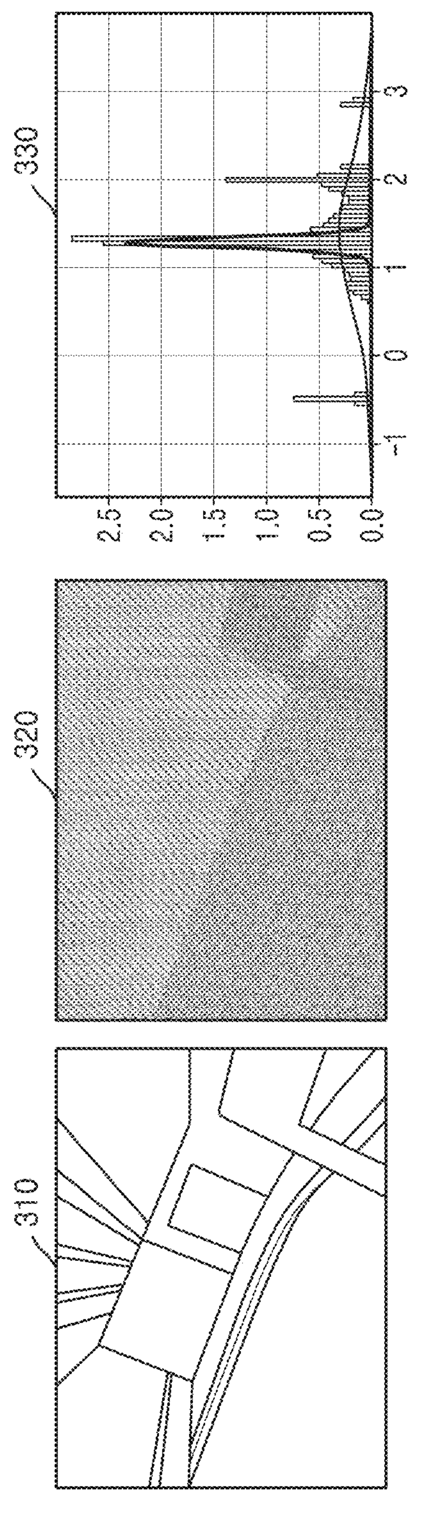
FIG. 3 is a diagram illustrating an example distribution model based on a depth map of an image, according to an embodiment of the present disclosure.

FIG. 3 is a diagram illustrating an example distribution model based on a depth map of an image, according to an embodiment of the present disclosure.

Referring to FIG. 3, the processor 1820 of the image processing device 1800 may obtain a distribution model 330 based on a depth map 320 of an input image 310. The processor 1820 of the image processing device 1800 may approximate a distance value distribution of two objects in the input image 310 to two Gaussian distribution models in order to distinguish between the two objects. The input image 310 may be divided into a near object and a distant background according to the two Gaussian distributions of the distribution model 330.

According to the Gaussian distributions of the distribution model 330 for the depth map 320 of the input image 310, there may be two Gaussian distributions having similar average values and different variances and standard deviations. Accordingly, objects of the input image 310 may be divided into two objects corresponding to the two Gaussian distributions.

Figure 4:
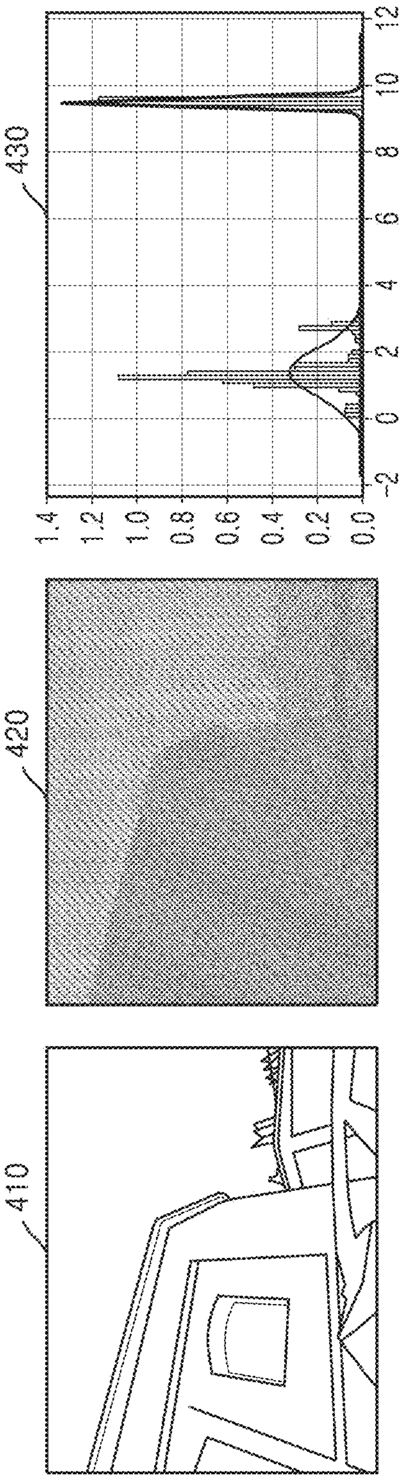
FIG. 4 is a diagram illustrating an example distribution model based on a depth map of an image, according to an embodiment of the present disclosure.

FIG. 4 is a diagram illustrating an example distribution model based on a depth map of an image, according to an embodiment of the present disclosure.

Referring to FIG. 4, the processor 1820 of the image processing device 1800 may obtain a distribution model 430 based on a depth map 420 of an input image 410. The processor 1820 of the image processing device 1800 may approximate a distance value distribution of two objects in the input image 410 to two Gaussian distribution models in order to distinguish between the two objects. The input image 410 may be divided into a near building and another relatively distant building according to the two Gaussian distributions of the distribution model 430.

According to the Gaussian distributions for the distribution model 430 for the depth map 420 of the input image 410, there may be a Gaussian distribution having a small average value and a great variance and standard deviation and another Gaussian distribution having a great average value and a small variation and standard deviation. Accordingly, objects of the input image 410 may be divided into two objects corresponding to the two Gaussian distributions.

Distance information of an image may be obtained by various methods. For example, the distance information may be information obtained through a distance sensor, depth camera, or radar, etc. of a camera photographing an image. Also, the distance information may be information obtained during three-dimensional (3D) restoration from a single or plurality of images. Also, the distance information may be information included in Z-Buffer in a graphic rendering process such as game.

Accordingly, a method for processing various types of depth maps may be needed, and the method may need to be applied to different kinds of data of absolute distance values and relative distance values (relative short- and long-distance information). Because different kinds of distance data have different distributions of distance values, a composited weight map may be calculated based on a distance value distribution of pixels of an image.

Figure 5:
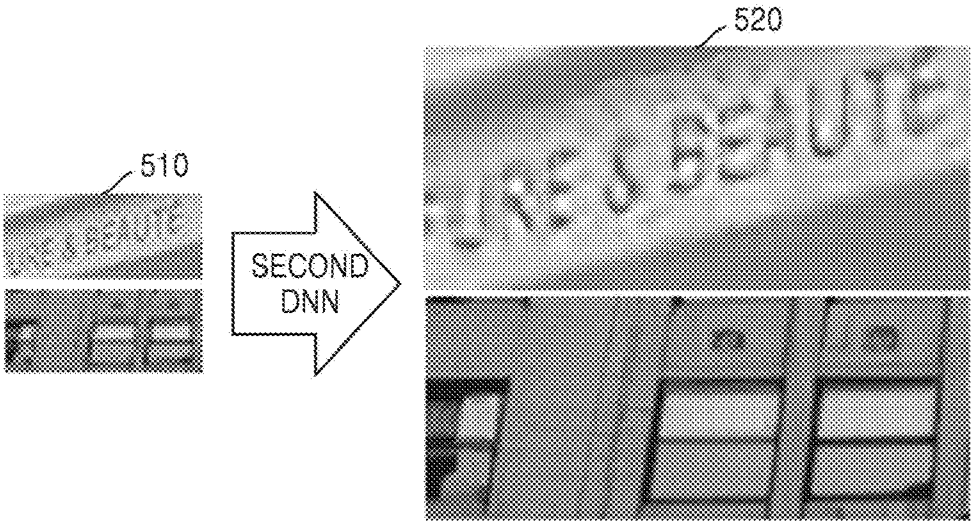
FIG. 5 is a diagram illustrating an example image restoration method based on a DNN suitable for restoring a distant object, according to an embodiment of the present disclosure.

FIG. 5 is a diagram illustrating an example image restoration method based on a DNN suitable for restoring a distant object, according to an embodiment of the present disclosure.

Referring to FIG. 5, an input image 510 may be input to the second DNN suitable for restoring a distant object and be restored to a first image 520. The second DNN may have characteristics of generating blurred output images with low noise and removing small textures from the output images. Accordingly, the first image 520 may be blurred and include no small textures of the input image 510. The second DNN may be, for example, a CNN based on an L1 loss model or an L2 loss model.

Figure 6:
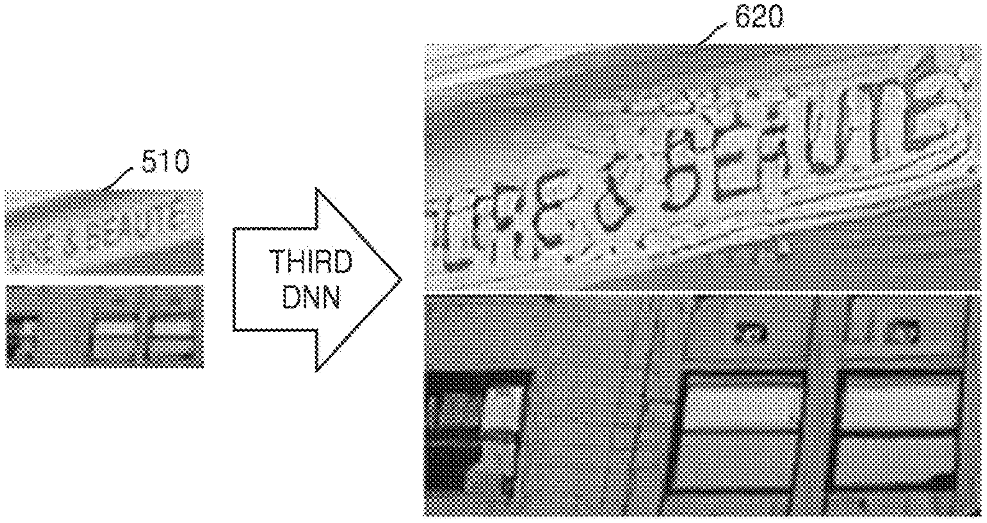
FIG. 6 is a diagram illustrating an example image restoration method based on a DNN suitable for restoring a near object, according to an embodiment of the present disclosure.

FIG. 6 is a diagram illustrating an example image restoration method based on a DNN suitable for restoring a near object, according to an embodiment of the present disclosure.

Referring to FIG. 6, an input image 510 may be input to the third DNN suitable for restoring a near object and be restored to a second image 620. The third DNN may have characteristics of generating clear output images due to its excellent texture restoration but leaving artifacts. Accordingly, the second image 620 may include artifacts although the second image 620 is clearer than the input image 510. The third DNN may be, for example, a DNN based on a GAN loss model.

Referring to FIGS. 5 and 6, because using a DNN based on one loss model to obtain a high-resolution image has an advantage and a disadvantage, it may be needed to improve image quality of an image by compositing the image while minimizing/reducing trade-off through a plurality of DNNs.

Different image quality improvement methods may need to be applied to objects according to distances although the objects are the same. Upon application of a single image quality restoration DNN, a restored image may become artificial, and a perspective of the restored image may disappear. Because pixels of an image have different focuses and different light environments depending on distances from a camera photographing the image, applying a single image quality improvement algorithm to all the pixels may make a restored image unnatural. For example, images photographed outdoors may show different definitions and colors with respect to the same object due to an environmental factor such as natural light. Accordingly, a method for obtaining an image with improved image quality by applying different DNNs according to distances using distance information may be needed.

Figure 7:
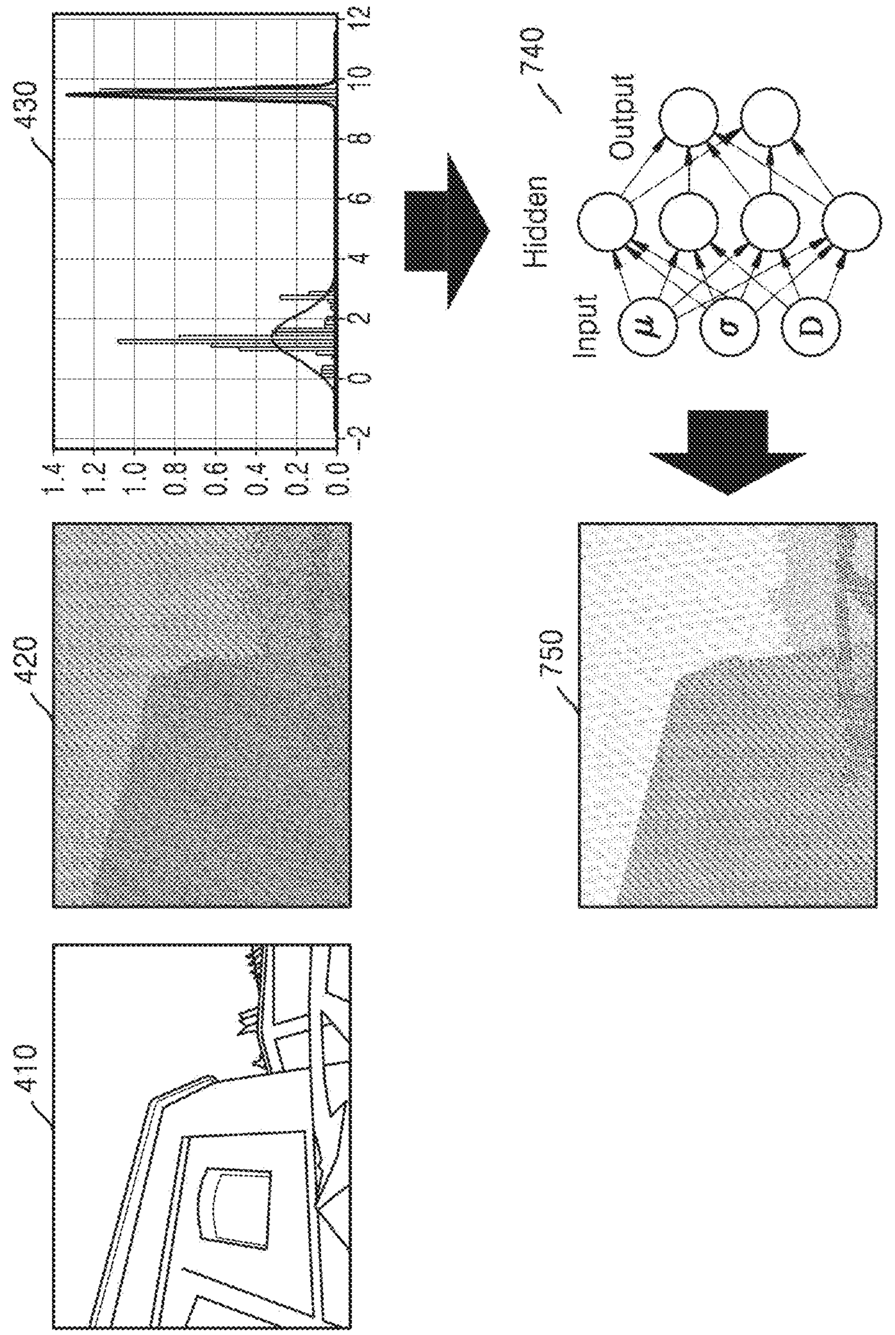
FIG. 7 is a diagram illustrating an example method of obtaining a composited weight map based on a distribution model of a depth map, according to an embodiment of the disclosure.

FIG. 7 is a diagram illustrating an example method for obtaining a composited weight map based on a distribution model of a depth map, according to an embodiment of the disclosure.

Referring to FIG. 7, because raw depth 420 of the input image 410, that is, unprocessed depth information has different units (for example, m, km, or an arbitrary scaling unit) and distributions of values, the processor 1820 of the image processing device 1800 may first measure a depth value distribution of the raw depth 420 of the input image 410. Under an assumption that two objects exist in the input image 410, averages, variances, and magnitude values of two distance distribution models (for example, Gaussian models 430) corresponding to the two objects may be obtained. Thereby, the processor 1820 of the image processing device 1800 may obtain a feature map that distinguishes between the objects of the input image 410. Composited weights may be calculated using the feature map, that is, the averages, variances, and standard deviations of the Gaussian distribution models, as input features of a DNN 740. Using the composited weights obtained through the DNN 740, characteristics of the input image 410 may be better revealed. In this case, the DNN 740 may be a general CNN. The DNN 740 may have been trained to generate a composited weight map through a plurality of training feature maps. Through the process, a raw depth value having an arbitrary value range may be transformed into a composited weight having value from 0 to 1. The DNN 740 may transform the depth values of the input image 410 nonlinearly to give a clear perspective of the image and cause objects in the image to be better distinguished. So, output image 750 is obtained via the DNN 740.

Figure 8:
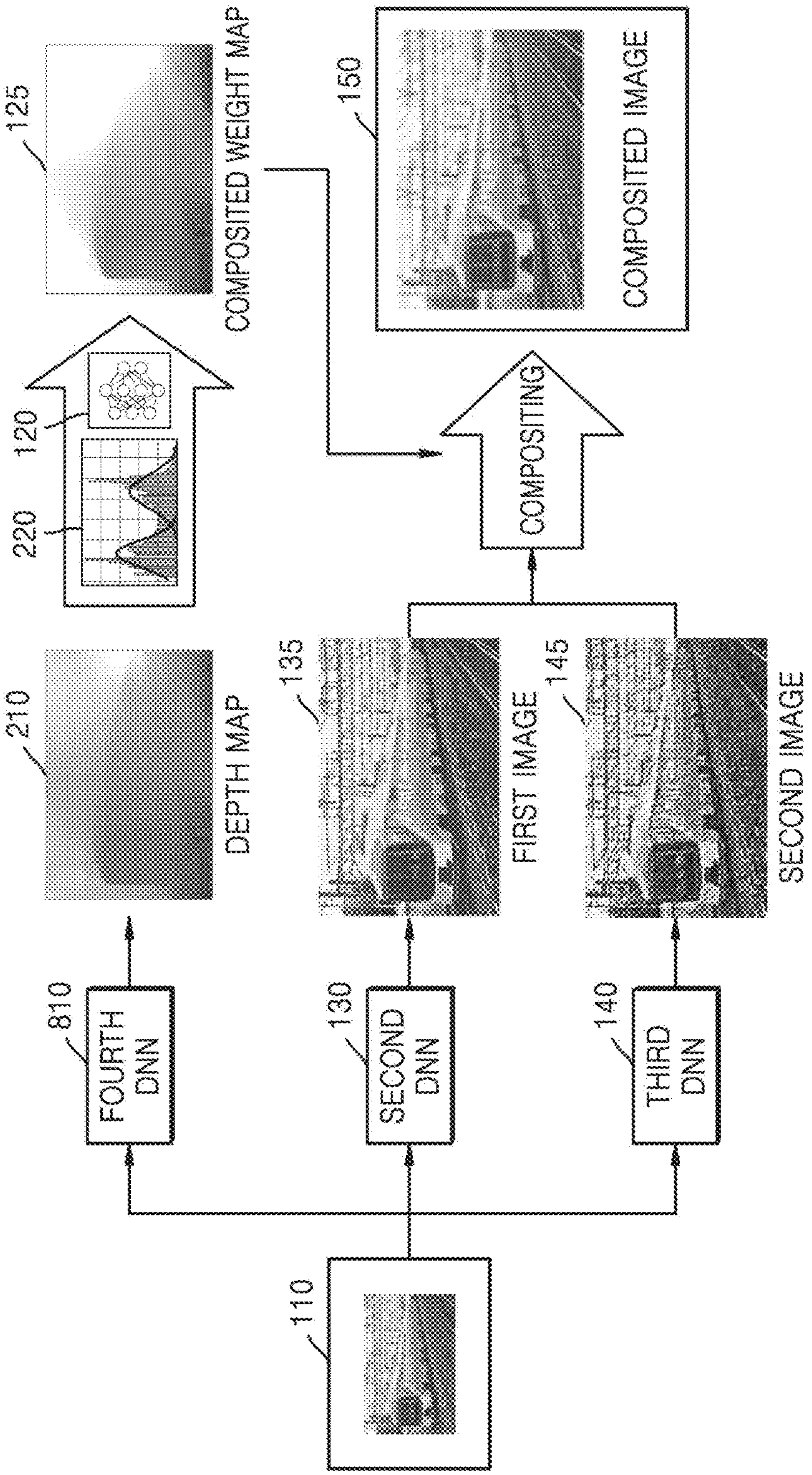
FIG. 8 is a diagram illustrating an example method of improving image quality of an input image based on a plurality of DNNs, according to an embodiment of the present disclosure.

FIG. 8 is a diagram illustrating an example method for improving image quality of an input image based on a plurality of DNNs, according to an embodiment of the present disclosure.

Referring to FIG. 8, the processor 1820 of the image processing device 1800 may obtain the depth map 210 through a fourth DNN 810 using the low-resolution input image 110 as an input, and apply the distribution model 220 to the depth map 210 to obtain a feature map that distinguishes between a near object and a distant object of the low-resolution input image 110. The processor 1820 of the image processing device 1800 may obtain the composited weight map 125 of the low-resolution input image 110 through the first DNN 120 using the feature map as an input. The fourth DNN 810 may be U-Net, or may have been trained to obtain a depth map of an input image using a plurality of training input images. An example of the fourth DNN 810 will be described in greater detail below with reference to FIG. 10, and an example of a method for training the fourth DNN 810 will be described in greater detail below with reference to FIGS. 11 and 12.

The processor 1820 of the image processing device 1800 may obtain the first image 135 through the second DNN 130 suitable for restoring a distant object using the low-resolution input image 110 as an input, and obtain the second image 145 through the third DNN 140 suitable for restoring a near object using the low-resolution input image 110 as an input.

The processor 1820 of the image processing device 1800 may obtain the composited image 150 by performing weighted averaging on the first image 135 and the second image 145 to composite the first image 135 with the second image 145 based on the composited weight map 125. A near object included in the composited image 150 may be clearer than that included in the low-resolution input image 110, and a distant object included in the composited image 150 may be softer than that included in the low-resolution input image 110. Accordingly, the composited image 150 may be a restored image of higher-resolution/higher-definition than the low-resolution input image 110.

Figure 9A:
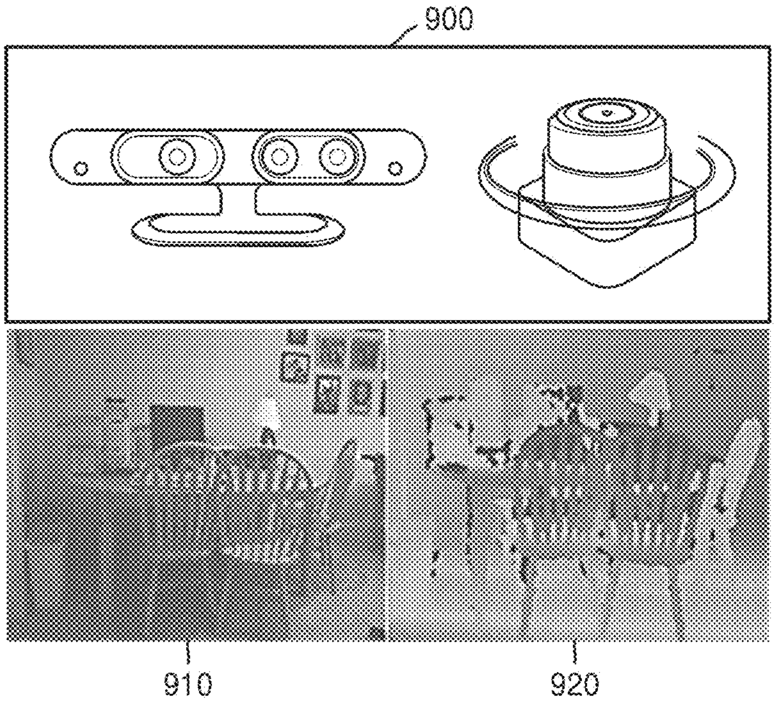
FIG. 9A is a diagram illustrating an example method of obtaining distance information through a distance sensor, according to an embodiment of the present disclosure.

FIG. 9A is a diagram illustrating an example method for obtaining distance information through a distance sensor, according to an embodiment of the present disclosure.

Referring to FIG. 9A, image capturing devices 900 may photograph an image 910 within a distance of 20 m from the image capturing devices 900. Upon photographing, the image capturing devices 900 may obtain distance information of objects in the image 910 through distance sensors included therein. Accordingly, the processor 1820 of the image processing device 1800 may obtain a depth map 920 based on the distance information included in the photographed image.

Figure 9B:
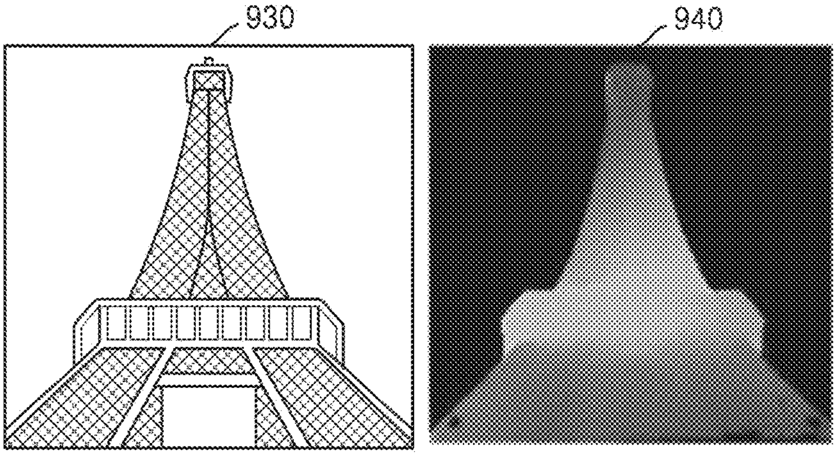
FIG. 9B is a diagram illustrating a limitation of a method of obtaining distance information through a distance sensor, according to an embodiment of the present disclosure.

FIG. 9B is a diagram illustrating an example limitation of a method for obtaining distance information through a distance sensor, according to an embodiment of the present disclosure.

Referring to FIG. 9B, when the imaging devices 900 photograph an outdoor image 930 within a distance of 300 m or less, the distance sensors included in the imaging devices 900 may fail to recognize a very long distance such as the sky. In other words, due to a recognition range (for example, a range within 300 m) of the distance sensors, a distance of an object located several kilometers away from a target to be photographed may not be recognized. Accordingly, the processor 1820 of the image processing device 1800 may fail to obtain information about a long distance corresponding to the sky behind a tower of the image 930 from a depth map 940 of the image 930.

Figure 10:
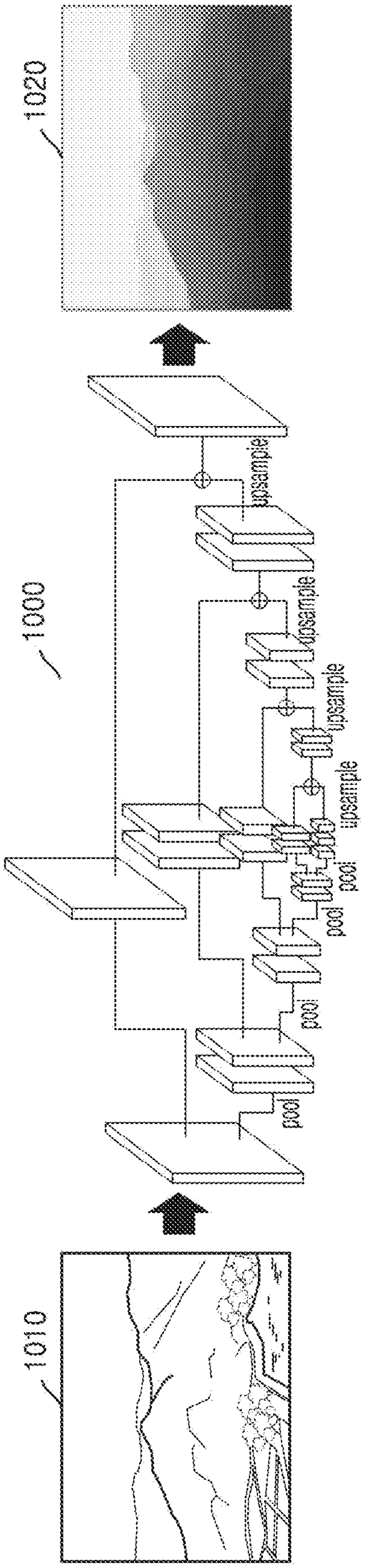
FIG. 10 is a diagram illustrating an example method of obtaining a depth map of an image using a DNN, according to an embodiment of the present disclosure.

FIG. 10 is a diagram illustrating an example method for obtaining a depth map of an image using a DNN, according to an embodiment of the present disclosure.

Referring to FIG. 10, the processor 1820 of the image processing device 1800 may input an input image 1010 to a trained DNN 1000 to obtain a depth map 1020 of the image 1010.

In order to train the DNN 1000 for obtaining the depth map 1020, multi-view drone flight images may be collected to generate annotations of relative depth information of the images. The DNN 1000 may be trained with a structure based, for example, on U-Net using the annotations of the relative depth information. The U-Net may be a U-shaped neural network including a plurality of pooling layers and a plurality of up-sampling layers.

Accordingly, the processor 1820 of the image processing device 1800 may obtain the depth map 1020 by inputting the image 1010 having a single view to the DNN 1000 trained with the annotations of the relative depth information.

An example of a method for training the DNN 1000 for obtaining a depth map will be described in greater detail below with reference to FIGS. 11 and 12.

Figure 11:
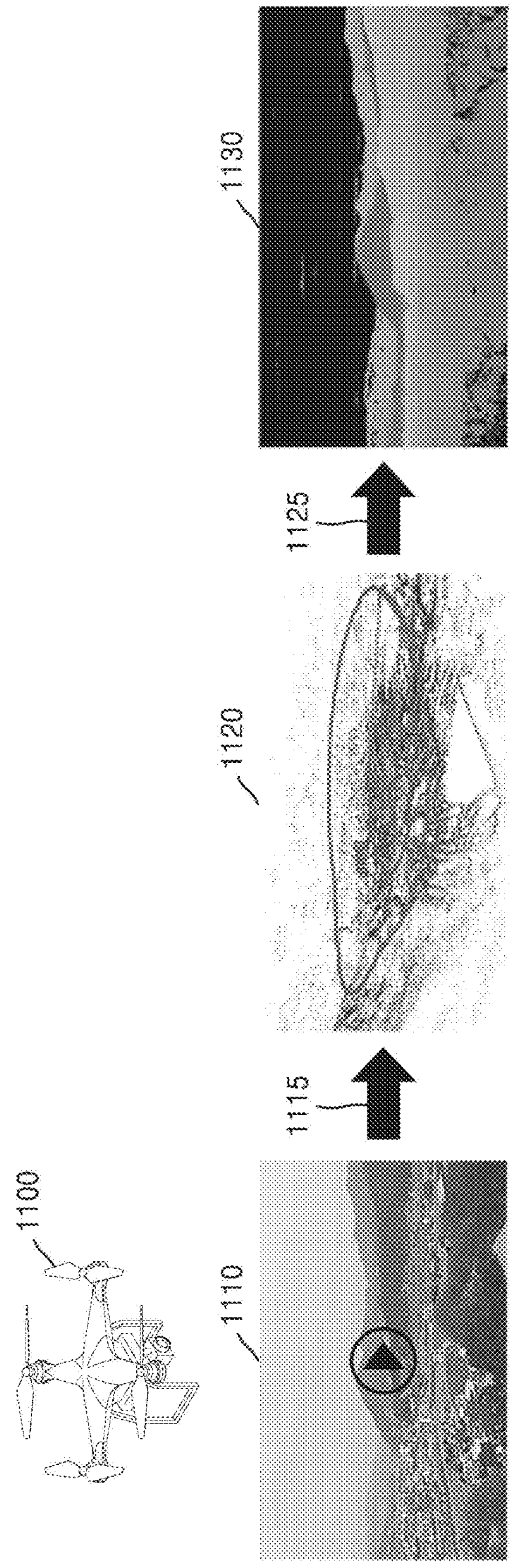
FIG. 11 is a diagram illustrating an example method of obtaining training data of a DNN for obtaining a depth map, according to an embodiment of the present disclosure.

FIG. 11 is a diagram illustrating an example method for obtaining training data of a DNN for obtaining a depth map, according to an embodiment of the present disclosure.

Referring to FIG. 11, an image 1110 may include objects (for example, a mountain, a river, a sea, a park, a city, etc.) located at a short distance, a middle distance, and a long distance (1 km or more).

To obtain training data, a multi-view image 1110 may be photographed through an image capturing device such as a drone 1100. By obtaining a structure of a photographed target from a motion of the drone 1100 photographed the multi-view image through Structure From Motion 1115, a sparse reconstruction image 1120 based on a location of a camera and 3D pixel points may be obtained. The Structure From Motion 1115 may be a method for predicting a three-dimensional structure through a plurality of two-dimensional images. By applying multi-view stereo matching 1125 to the sparse reconstruction image 1120, depth values may be predicted using photo consistency from multi-view images. The multi-view stereo matching 1125 may be a method for calculating disparity by comparing a target image with a reference image and generating a depth map according to the disparity. By matching a patch of an image with a patch of another image, depth values may be predicted. Through this process, measured data of a depth map that is used as training data for training a DNN that obtains a depth map 1130 may be obtained.

Figure 12:
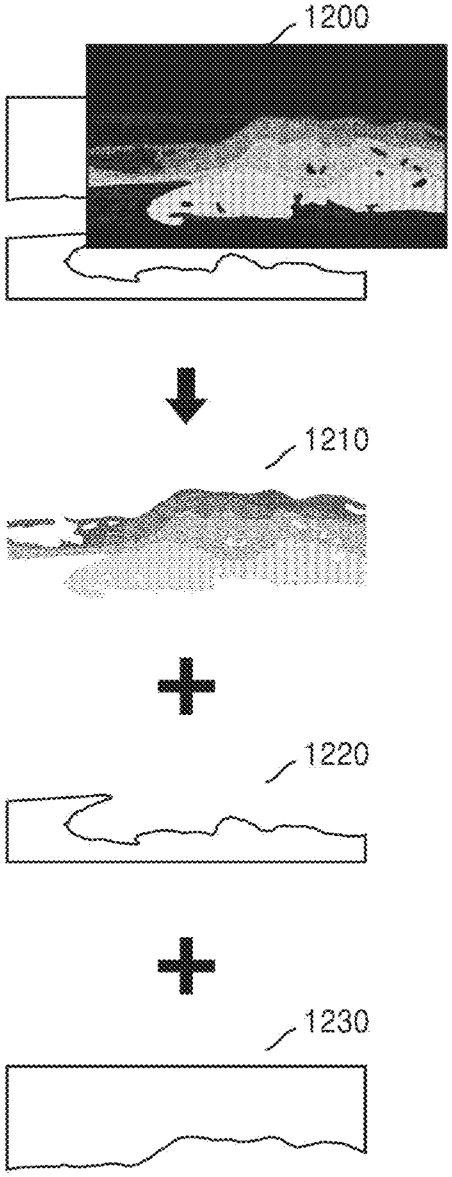
FIG. 12 is a diagram illustrating an example method of training a DNN for obtaining a depth map, according to an embodiment of the present disclosure.

FIG. 12 is a diagram illustrating an example method for training a DNN for obtaining a depth map, according to an embodiment of the present disclosure.

To predict a depth of a textureless region (for example, the sky, water, etc.) that is difficult to be measured even using a distance sensor and multi-view stereo matching, a segmentation map for the textureless region may be additionally used.

An image 1200 including a depth map and a segmentation map may be divided into a masked depth map 1210, a water region 1220, and a sky region 1230.

By obtaining loss information for each region, a loss function of a DNN for obtaining a depth map may be determined.

For example, a loss function of a DNN for obtaining a depth map may include first loss information of scale-invariant MSE term Ldata, second loss information of multi-scale gradient term Lgrad, third loss information of multi-scale and edge-aware smoothness term Lsmooth, fourth loss information of multi-scale and water gradient term Lwater, and fifth loss information of sky maximization term Lsky.

For example, the first loss information according to mean square errors of differences between measured depth values of training data and depth values predicted through the DNN at the same pixel locations, based on the masked depth map 1210 masked to exclude the water region 1220 and the sky region 1230 from the depth map, and the second loss information for recovering, when there are no sharp changes between the depth values predicted through the DNN, with respect to a region where sharp changes are generated between the measured depth values of the training data, sharp discontinuity of the depth values to match with the sharp changes between the measured depth values, and smoothing a gradient change of a region where the discontinuity occurs may be obtained.

Through smooth interpolation on depth values of the textureless water region of which depths cannot be restored using segmentation information indicating a water region, based on the water region 1220 separated from the segmentation map, the third loss information may be obtained, and to predict depth values of the water region that cannot be measured, the fourth loss information may be obtained using a fact that a gradient in x-axis direction of the water region is zero and a gradient in y-axis direction of the water region is a positive number because the water region is flat.

By adjusting a gradient of the sky region to maximize depths of the sky region compared to predicted depths of other objects and smooth depth values of the sky region, based on the sky region 1230 separated from the segmentation map, the fifth loss information for predicting the depth values of the sky region that cannot be measured may be obtained.

The DNN for obtaining a depth map of an image may be trained in such a way as to minimize/reduce a loss function (Ldepth=a*Ldata+b*Lgrad+c*Lsmooth+d*Lwater+e*Lsky) including the five pieces of loss information, wherein a, b, c, d, and e may correspond to preset weights.

The DNN for obtaining a depth map of an image may be trained in such a way as to minimize/reduce a value of the loss function using the training data. The depth map of the input image may be obtained through the DNN.

Figure 13:
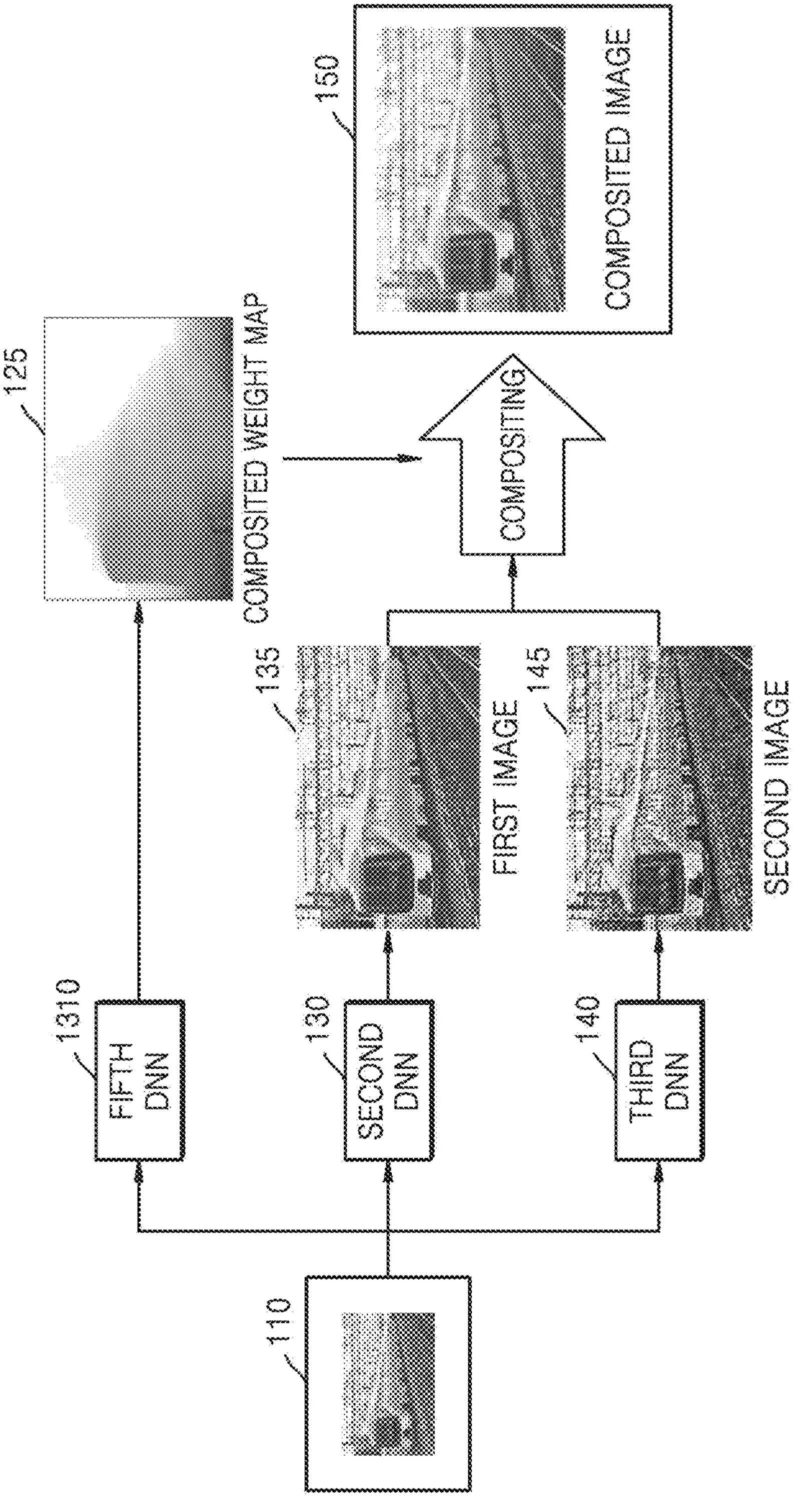
FIG. 13 is a diagram illustrating an example method of improving image quality of an input image based on a plurality of DNNs, according to an embodiment of the present disclosure.

FIG. 13 is a diagram illustrating an example method for improving image quality of an input image based on a plurality of DNNs, according to an embodiment of the present disclosure.

Referring to FIG. 13, the processor 1820 of the image processing device 1800 may obtain the composited weight map 125 of the low-resolution input image 110 through a fifth DNN 1310 using the low-resolution input image 110 as an input. The fifth DNN 1310 may be U-Net, and may have been trained to at once perform a process of obtaining a feature map that distinguishes between a near object and a distant object of the input image 110 by applying the distribution model 220 to the depth map of the input image 110, and obtaining the composited weight map 125 through the first DNN 120 using the feature map as an input.

The processor 1820 of the image processing device 1800 may obtain the first image 135 through the second DNN 130 suitable for restoring a distant object using the low-resolution input image 110 as an input, and obtain the second image 145 through the third DNN 140 suitable for restoring a near object using the low-resolution input image 110 as an input.

The processor 1820 of the image processing device 1800 may obtain the composited image 150 by performing weighted averaging on the first image 135 and the second image 145 to composite the first image 135 with the second image 145 based on the composited weight map 125. A near object included in the composited image 150 may be clearer than that included in the low-resolution input image 110, and a distant object included in the composited image 150 may be softer than that included in the low-resolution input image 110. Accordingly, the composited image 150 may be a restored image of higher-resolution/higher-definition than the low-resolution input image 110.

Figure 14:
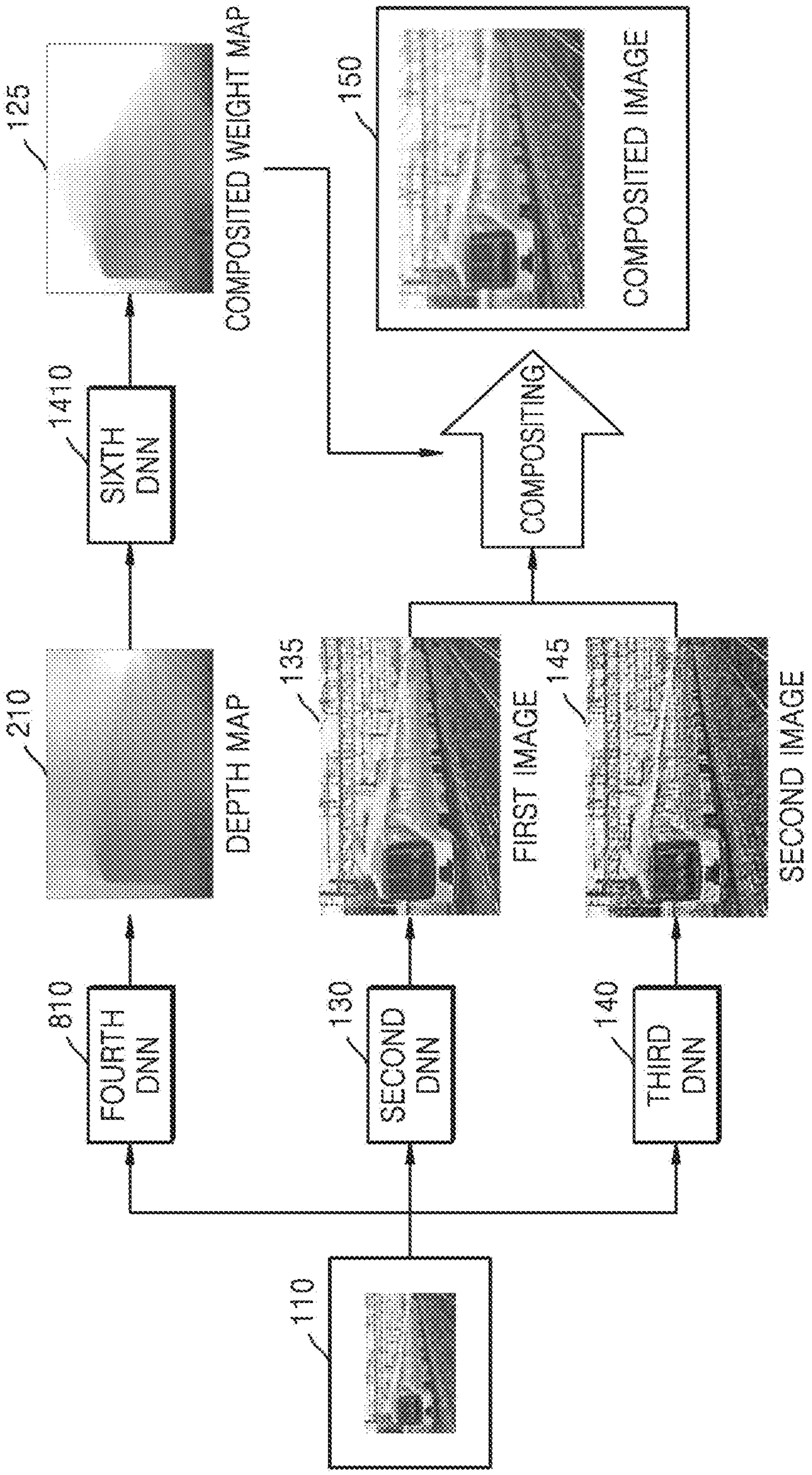
FIG. 14 is a diagram illustrating an example method of improving image quality of an input image based on a plurality of DNNs, according to an embodiment of the present disclosure.

FIG. 14 is a diagram illustrating an example method for improving image quality of an input image based on a plurality of DNNs, according to an embodiment of the present disclosure.

Referring to FIG. 14, the processor 1820 of the image processing device 1800 may obtain the depth map 210 through a fourth DNN 810 using the low-resolution input image 110 as an input, and obtain the composited weight map 125 of the low-resolution input image 110 through a sixth DNN 1410 using the depth map 210 as an input. The sixth DNN 1410 may be a general CNN, and may have been trained to at once perform a process of obtaining a feature map that distinguishes between a near object and a distant object of the low-resolution input image 110 by applying the distribution model 220 of FIG. 8, and obtaining the composited weight map 125 through the first DNN 120 using the feature map as an input.

The processor 1820 of the image processing device 1800 may obtain the first image 135 through the second DNN 130 suitable for restoring the distant object using the low-resolution input image 110 as an input, and obtain the second image 145 through the third DNN 140 suitable for restoring the near object using the low-resolution input image 110 as an input.

The processor 1820 of the image processing device 1800 may obtain the composited image 150 by performing weighted averaging on the first image 135 and the second image 145 to composite the first image 135 with the second image 145 based on the composited weight map 125. A near object included in the composited image 150 may be clearer than that included in the low-resolution input image 110, and a distant object included in the composited image 150 may be softer than that included in the low-resolution input image 110. Accordingly, the composited image 150 may be a restored image of higher-resolution/higher-definition than the low-resolution input image 110.

Figure 15:
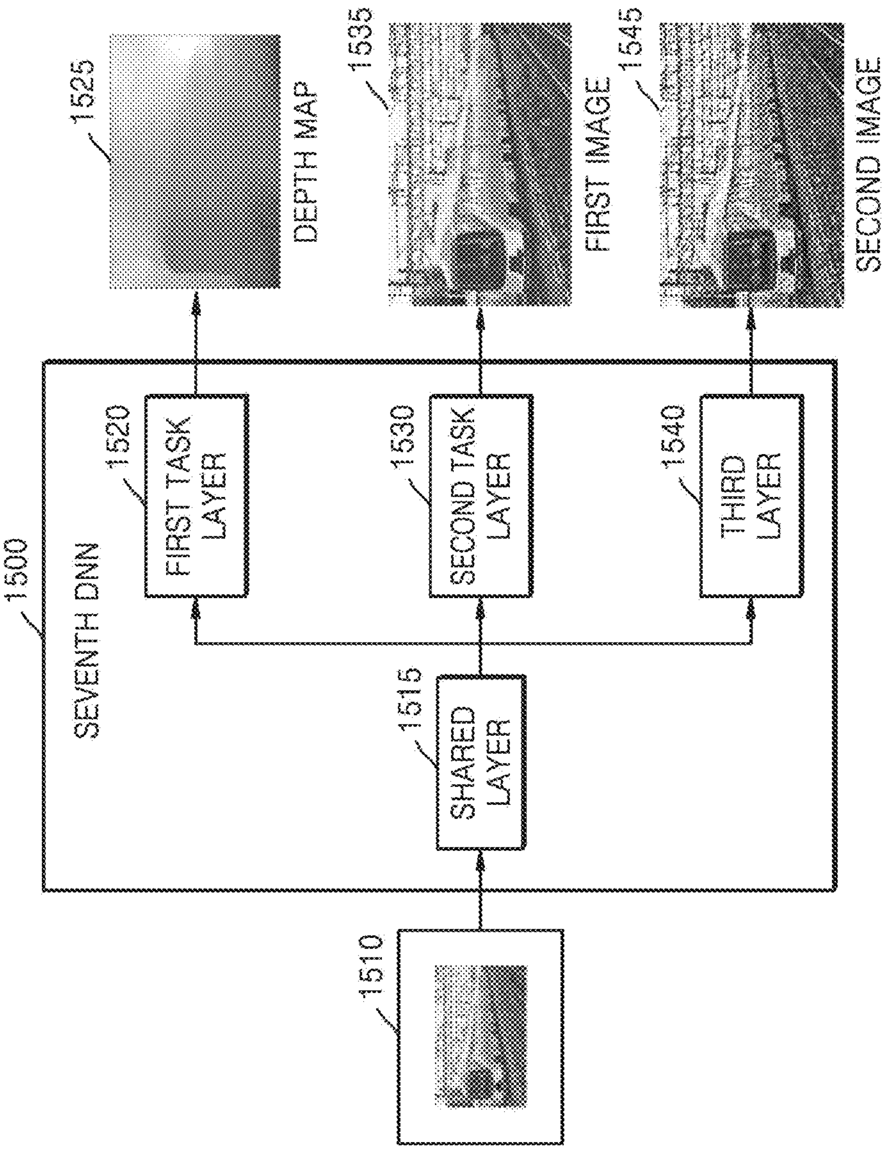
FIG. 15 is a diagram illustrating an example method of using a multi-task DNN, according to an embodiment of the present disclosure.

FIG. 15 is a diagram illustrating an example method for using a multi-task DNN according to an embodiment of the present disclosure.

In the disclosure, a task may refer to an object to be solved or a task to be performed through machine learning. For example, depth map extraction, image extraction suitable for distant objects, image extraction suitable for near objects, etc. may correspond to individual tasks.

In the disclosure, a multi-task DNN may refer to a DNN that performs learning on a plurality of tasks using one model.

Referring to FIG. 15, the processor 1820 of the image processing device 1800 may obtain a depth map 1525, a first image 1535, and a second image 1545 by inputting a low-resolution input image 1510 to a seventh DNN 1500 that performs a plurality of tasks. More specifically, the seventh DNN 1500 may include a shared layer 1515, a first task layer 1520, a second task layer 1530, and a third task layer 1540, wherein the shared layer 1515 may be a layer for extracting shared features of the input image 1510, the first task layer 1520 may be a layer for obtaining the depth map 1525 of the input image 1520 using the feature map extracted from the shared layer 1515 as an input, the second task layer 1530 may be a layer suitable for restoring a distant object to obtain the first image 1535 using the feature map extracted from the shared layer 1515 as an input, and the third task layer 1540 may be a layer suitable for restoring a near object to obtain the second image 1545 using the feature map extracted from the shared layer 1515 as an input. The shared layer 1515, the first task layer 1520, the second task layer 1530, and the third task layer 1540 may each include a plurality of layers.

A multi-task DNN may efficiently estimate three of the depth map 1525, the first image 1535, and the second image 1545 by learning a plurality of tasks through a DNN model including the shared layer 1515.

The processor 1820 of the image processing device 1800 may obtain the depth map 1525, the first image 1535, and the second image 1545 through the seventh DNN 1500 that is a multi-task DNN. The processor 1820 of the image processing device 1800 may obtain a feature map by applying a distribution model to the depth map 1525, and obtain a composited weight map by inputting the feature map to the first DNN 120. The processor 1820 of the image processing device 1800 may composite the first image 1535 and the second image 1545 based on the composited weight map to obtain a restored image of high-definition/high-resolution.

Figure 16:
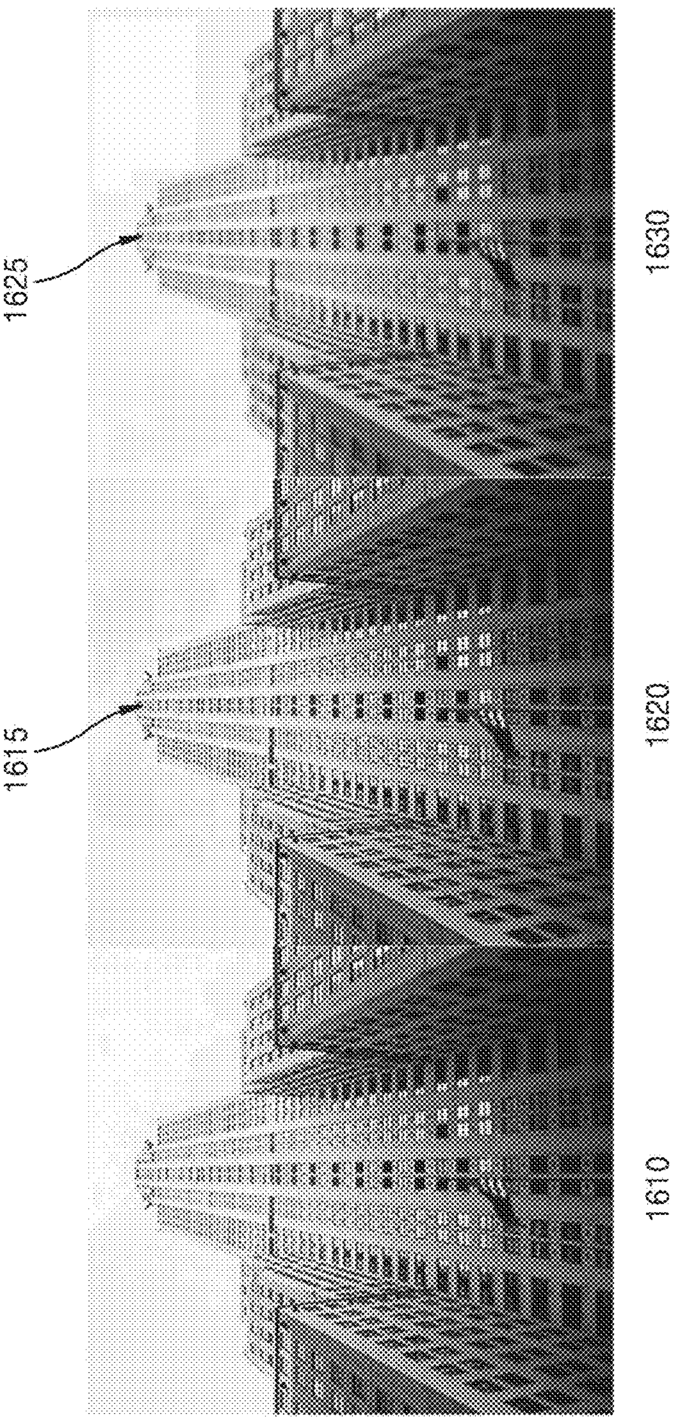
FIG. 16 is a diagram illustrating a difference between an image restoration method based on a DNN suitable for restoring a near object and an image restoration method based on a plurality of DNNs according to an embodiment of the present disclosure.

FIG. 16 is a diagram illustrating a difference between an image restoration method based on a DNN suitable for restoring a near object and an image restoration method based on a plurality of DNNs according to an embodiment of the present disclosure.

Referring to FIG. 16, restoring an image by applying a GAN loss model-based DNN suitable for restoring near objects to an original image 1610 may cause a problem that a distant object is excessively clear and artifacts are generated, like a distant region 1615 of a first restored image 1620. Accordingly, because a long distance is clear, there may be no sense of perspective and it may feel unnatural. Through compositing using a plurality of DNNs, that is, a DNN suitable for restoring distant objects and a DNN suitable for restoring near objects, according to an embodiment, a distant region may be soft and blurred to be natural, like a distant region 1625 of a second restored image 1630, resulting in an improvement of image quality of a restored image compared to an original image.

Figure 17:
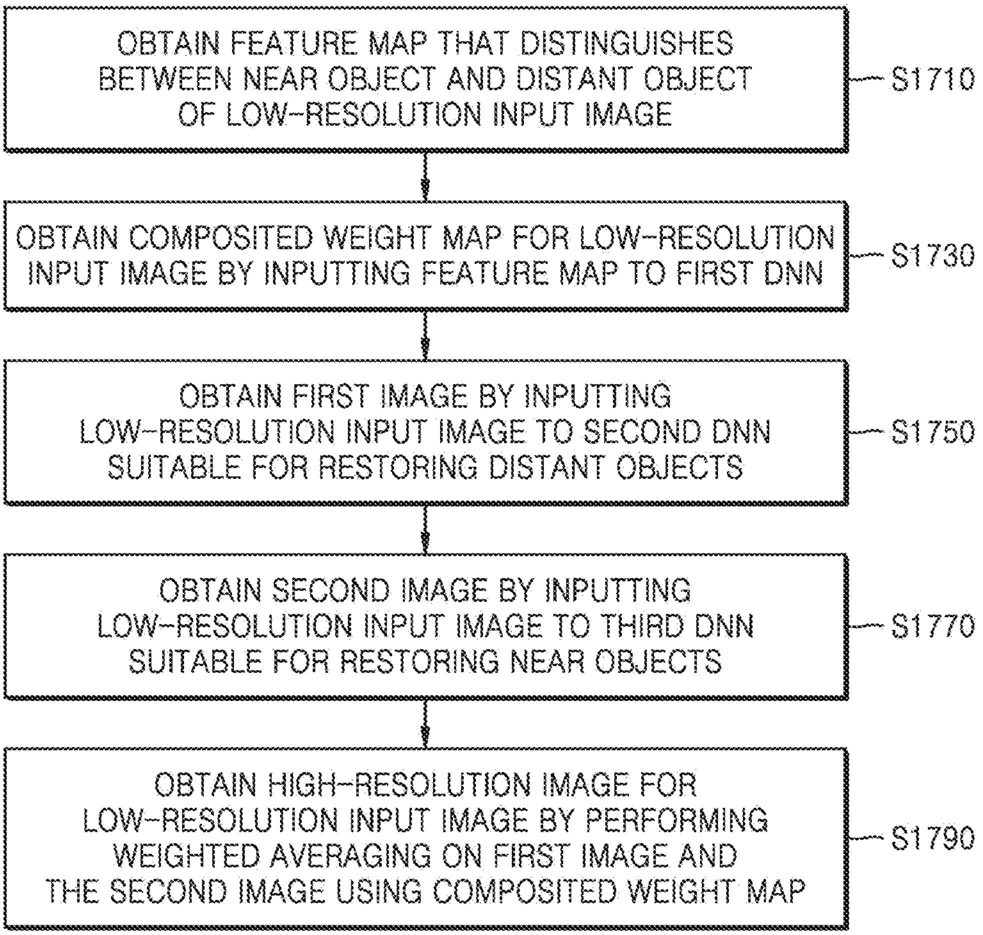
FIG. 17 is a flowchart illustrating an example method of improving image quality of an input image based on a plurality of DNNs, according to an embodiment of the present disclosure.

FIG. 17 is a flowchart illustrating an example method for improving image quality of an input image based on a plurality of DNNs, according to an embodiment of the present disclosure.

Referring to FIG. 17, in operation S1710, the processor 1810 of the image processing device 1800 may obtain a feature map that distinguishes between a near object and a distant object of a low-resolution input image.

According to an embodiment, the feature map may be obtained by applying a distribution model to a depth map of the low-resolution image.

According to an embodiment, the distribution model may be a Gaussian distribution model.

According to an embodiment, the depth map may be obtained from distance information included in the low-resolution input image.

According to an embodiment, the depth map may be obtained from distance information included in the low-resolution input image.

According to an embodiment, the depth map may be obtained through a 3D reconstruction method.

According to an embodiment, the depth map may be obtained from distance information obtained during a graphics rendering process.

According to an embodiment, the distribution model may be applied to each object existing in the low-resolution input image.

In operation S1730, the processor 1810 of the image processing device 1800 may obtain a composited weight map for the low-resolution input image by inputting the feature map to the first DNN.

According to an embodiment, the first DNN may distinguish at least one object in the low-resolution input image by nonlinearly transforming depth values of the depth map.

According to an embodiment, the depth map may be obtained through the fourth DNN trained to extract depth information of an image.

According to an embodiment, the fourth DNN may be a U-shaped neural network.

In operation S1750, the processor 1810 of the image processing device 1800 may obtain a first image by inputting the low-resolution input image to the second DNN suitable for restoring distant objects.

In operation S1770, the processor 1810 of the image processing device 1800 may obtain a second image by inputting the low-resolution input image to the third DNN suitable for restoring near objects.

According to an embodiment, the second DNN may be a DNN that uses one of an L1 loss model or an L2 loss model, and the third DNN may be a DNN that uses a GAN model.

In operation S1790, the processor 1810 of the image processing device 1800 may obtain a high-resolution image for the low-resolution input image by performing weighted averaging on the first image and the second image using the composited weight map.

Figure 18:
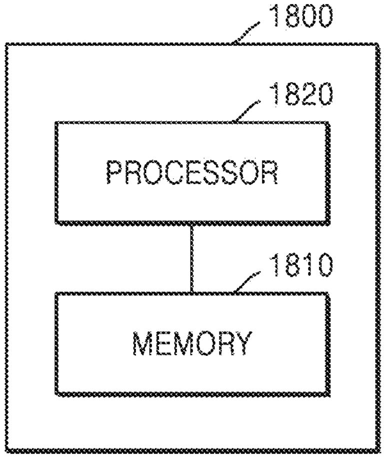
FIG. 18 is a block diagram illustrating an example configuration of an image processing device according to an embodiment of the present disclosure.

FIG. 18 is a block diagram illustrating an example configuration of an image processing device according to an embodiment of the present disclosure.

The image processing device 1800 according to an embodiment may include a memory 1810 and at least one processor (e.g., including processing circuitry) 1820 connected to the memory 1810. Operations of the image processing device 1800 according to an embodiment may operate by individual processors, or may operate by a control of a central processor. The memory 1810 of the image processing device 1800 may store information about data received from outside and data generated by the processor, for example, a feature map, a first image, a second image, and a composited weight map.

The processor 1820 of the image processing device 1800 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 1820 may for example, obtain a feature map that distinguishes between a near object and a distant object of a low-resolution input image, obtain a composited weight map for the low-resolution input image by inputting the feature map to a first DNN, obtain a first image by inputting the low-resolution input image to a second DNN suitable for restoring a distant object, obtain a second image by inputting the low-resolution input image to a third DNN suitable for restoring a near object, and obtain a high-resolution image for the low-resolution input image by performing weighted averaging on the first image and the second image using the composited weight map.

The image processing method based on the neural network, according to an example embodiment of the present disclosure, may include: obtaining a feature map distinguishing between a near object and a distant object of a low-resolution input image, obtaining a composited weight map for the low-resolution input image by inputting the feature map to a first DNN, obtaining a first image by inputting the low-resolution input image to a second DNN suitable for restoring a distant object, obtaining a second image by inputting the low-resolution input image to a third DNN suitable for restoring a near object, and obtaining a high-resolution image for the low-resolution input image by performing weighted averaging on the first image and the second image using the composited weight map.

According to an example embodiment of the present disclosure, the second DNN may include a DNN using any one of an L1 loss model or an L2 loss model, and the third DNN may include a DNN using a GAN model.

According to an example embodiment of the present disclosure, the feature map may be obtained by applying a distribution model to a depth map of the low-resolution image.

According to an example embodiment of the present disclosure, the distribution model may be a Gaussian distribution model.

According to an example embodiment of the present disclosure, the depth map may be obtained from distance information included in the low-resolution input image.

According to an example embodiment of the present disclosure, the depth map may be obtained through a 3D restoration method.

According to an example embodiment of the present disclosure, the depth map may be obtained from distance information obtained during a graphics rendering process.

According to an example embodiment of the present disclosure, the distribution model may be applied to each object existing in the low-resolution input image.

According to an example embodiment of the present disclosure, the first DNN may distinguish at least one object in the low-resolution input image by nonlinearly transforming depth values of the depth map.

According to an example embodiment of the present disclosure, the depth map may be obtained through a fourth DNN trained to extract depth information of an image.

According to an example embodiment of the present disclosure, the fourth DNN may include a U-shaped neural network.

The image processing method based on the neural network, according to an embodiment of the present disclosure, may perform compositing using different DNNs according to distances, that is, a DNN suitable for restoring distant objects and a DNN suitable for restoring near objects, resulting in an improvement of image quality of a restored image compared to an original image.

An image processing device based on a neural network, according to an example embodiment of the present disclosure, may include: a memory; and at least one processor, comprising processing circuitry, wherein at least one processor, individually and/or collectively may be configured to: obtain a feature map distinguishing between a near object and a distant object of a low-resolution input image, obtain a composited weight map for the low-resolution input image by inputting the feature map to a first DNN, obtain a first image by inputting the low-resolution input image to a second DNN suitable for restoring a distant object, obtain a second image by inputting the low-resolution input image to a third DNN suitable for restoring a near object, and obtain a high-resolution image for the low-resolution input image by performing weighted averaging on the first image and the second image using the composited weight map.

According to an example embodiment of the present disclosure, the second DNN may including a DNN using any one of an L1 loss model or an L2 loss model, and the third DNN may include a DNN using a GAN model.

According to an example embodiment of the present disclosure, the feature map may be obtained by applying a distribution model to a depth map of the low-resolution image.

According to an example embodiment of the present disclosure, the distribution model may be a Gaussian distribution model.

According to an example embodiment of the present disclosure, the depth map may be obtained from distance information included in the low-resolution input image.

According to an example embodiment of the present disclosure, the depth map may be obtained through a 3D restoration method.

According to an example embodiment of the present disclosure, the depth map may be obtained from distance information obtained during a graphics rendering process.

According to an example embodiment of the present disclosure, the distribution model may be applied to each object existing in the low-resolution input image.

According to an example embodiment of the present disclosure, the first DNN may distinguish at least one object in the low-resolution input image by nonlinearly transforming depth values of the depth map.

According to an example embodiment of the present disclosure, the depth map may be obtained through a fourth DNN trained to extract depth information of an image.

According to an example embodiment of the present disclosure, the fourth DNN may be a U-shaped neural network.

The image processing device based on the neural network, according to an embodiment of the present disclosure, may perform compositing using different DNNs according to distances, that is, a DNN suitable for restoring distant objects and a DNN suitable for restoring near objects, resulting in an improvement of image quality of a restored image compared to an original image.

Meanwhile, various example embodiments of the present disclosure described above may be generated as programs or instructions executable in a computer, and the generated programs or instructions may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium may include magnetic media, such as a hard disk, a floppy disk, and a magnetic tape, optical recording media, such as compact disc read-only memory (CD-ROM) and digital versatile disc (DVD), magneto-optical media such as a floptical disk, and read only memory (ROM), random access memory (RAM), and a flash memory, which are configured to store program instructions. Other examples of the medium may include recording media and storage media managed by application stores distributing applications or by sites, servers, and the like supplying or distributing other various types of software.

Meanwhile, the models related to the DNNs described above may be implemented as software modules. When the DNN models are implemented as software modules (for example, program modules including instructions), the DNN models may be stored in a computer-readable recording medium.

The DNN models may be integrated into a form of a hardware chip to become a part of the image processing device 1800 described above. For example, the DNN models may be manufactured in a form of an dedicated hardware chip for Artificial Intelligence, or may be manufactured as a part of an existing general-purpose processor (for example, central processing unit (CPU) or application processor) or a graphic-dedicated processor (for example, graphics processing unit (GPU)).

The DNN models may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

Although the present disclosure has been described in detail according to various example embodiments, it should be noted that the present disclosure is not limited to these embodiments, and various modifications and changes can be made by one of ordinary skill in the art within the scope of the present disclosure.

The machine-readable storage media may be provided in a form of non-transitory storage media. In this regard, the 'non-transitory storage medium' is a tangible device, and may not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., CD-ROM), or be distributed (e.g., downloadable or uploadable) online via an application store or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, the application store's server, or a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An image processing method based on a neural network, the image processing method comprising:

obtaining a feature map distinguishing between a near object and a distant object of a low-resolution input image;

obtaining a composited weight map for the low-resolution input image by inputting the feature map to a first Deep Neural Network (DNN);

obtaining a first image by inputting the low-resolution input image to a second DNN trained to restore the distant object in the low-resolution input image;

obtaining a second image by inputting the low-resolution input image to a third DNN trained to restore the near object in the low-resolution input image; and obtaining a high-resolution image corresponding to the low-resolution input image by performing weighted averaging on the first image and the second image using the composited weight map.

2. The image processing method of claim 1, wherein the second DNN comprises a DNN using one of an L1 loss model or an L2 loss model, and the third DNN comprises a DNN using a Generative Adversarial Network (GAN) model.

3. The image processing method of claim 1, further comprising:

obtaining the feature map by applying a distribution model to a depth map of the low-resolution input image.

4. The image processing method of claim 3, wherein the distribution model is a Gaussian distribution model.

5. The image processing method of claim 3, further comprising:

obtaining the depth map from distance information included in the low-resolution input image.

6. The image processing method of claim 3, further comprising:

obtaining the depth map through a three-dimensional (3D) restoration method.

7. The image processing method of claim 3, further comprising:

obtaining the depth map from distance information obtained in a graphics rendering process.

8. The image processing method of claim 3, further comprising:

applying the distribution model to each object existing in the low-resolution input image.

9. The image processing method of claim 3, wherein the first DNN is configured to distinguish at least one object in the low-resolution input image by nonlinearly transforming a depth value of the depth map.

10. The image processing method of claim 3, further comprising:

obtaining the depth map through a fourth DNN trained to extract depth information of an image.

11. The image processing method of claim 10, wherein the fourth DNN comprises a U-shaped neural network.

12. An image processing device based on a neural network, the image processing device comprising:

memory; and at least one processor, comprising processing circuitry, wherein the memory stores instructions which, when executed by the at least one processor, individually and/or collectively, cause the image processing device to:

obtain a feature map distinguishing between a near object and a distant object of a low-resolution input image, obtain a composited weight map for the low-resolution input image by inputting the feature map to a first Deep Neural Network (DNN), obtain a first image by inputting the low-resolution input image to a second DNN trained to restore the distant object in the low-resolution input image, obtain a second image by inputting the low-resolution input image to a third DNN trained to restore the near object in the low-resolution input image, and obtain a high-resolution image corresponding to the low-resolution input image by performing weighted averaging on the first image and the second image using the composited weight map.

13. The image processing device of claim 12, wherein the second DNN comprises a DNN using one of an L1 loss model or an L2 loss model, and the third DNN comprises a DNN using a Generative Adversarial Network (GAN) model.

14. The image processing device of claim 12, wherein the memory stores instructions which, when executed by the at least one processor individually and/or collectively, cause the image processing device to:

obtain the feature map by applying a distribution model to a depth map of the low-resolution input image.

15. The image processing device of claim 14, wherein the distribution model is a Gaussian distribution model.

16. A non-transitory computer-readable storage medium storing instructions which, when executed by at least one processor comprising processing circuitry, cause the at least one processor to:

obtain a feature map distinguishing between a near object and a distant object of a low-resolution input image;

obtain a composited weight map for the low-resolution input image by inputting the feature map to a first Deep Neural Network (DNN);

obtain a first image by inputting the low-resolution input image to a second DNN trained to restore the distant object in the low-resolution input image;

obtain a second image by inputting the low-resolution input image to a third DNN trained to restore the near object in the low-resolution input image; and obtain a high-resolution image corresponding to the low-resolution input image by performing weighted averaging on the first image and the second image using the composited weight map.

17. An electronic device comprising the non-transitory computer-readable storage medium of claim 16.

* * * * *